United States Patent
Odinak et al.

(10) Patent No.: US 8,948,371 B2
(45) Date of Patent: Feb. 3, 2015

(54) SYSTEM AND METHOD FOR MANAGING HOLD TIMES DURING AUTOMATED CALL PROCESSING

(75) Inventors: Gilad Odinak, Bellevue, WA (US); Adam Waalkes, Sammamish, WA (US)

(73) Assignee: Intellisist, Inc., Seattle, WA (US)

( * ) Notice: Subject to any disclaimer, the term of this patent is extended or adjusted under 35 U.S.C. 154(b) by 1445 days.

(21) Appl. No.: 12/039,558

(22) Filed: Feb. 28, 2008

(65) Prior Publication Data

US 2008/0205620 A1  Aug. 28, 2008

Related U.S. Application Data

(60) Provisional application No. 60/904,296, filed on Feb. 28, 2007.

(51) Int. Cl.
*H04M 3/00* (2006.01)
*H04M 3/428* (2006.01)
*H04M 3/42* (2006.01)
*H04M 3/523* (2006.01)

(52) U.S. Cl.
CPC ........ *H04M 3/4285* (2013.01); *H04M 3/42068* (2013.01); *H04M 3/523* (2013.01); *H04M 2201/40* (2013.01)
USPC .................................................. 379/266.06

(58) Field of Classification Search
CPC ............ H04M 3/493; H04M 3/42059; H04M 3/42068; H04M 3/51; H04M 3/5166; H04M 3/5175; H04M 3/5183; H04M 3/5191; H04M 3/523; H04M 3/5232; H04M 3/5233; H04M 3/5235; H04M 3/5236; H04M 3/5238; H04M 2203/40; H04M 2203/407; H04M 2203/408
USPC ............. 379/266.01, 265.02, 266.06, 266.02, 379/266.03, 265.09
See application file for complete search history.

(56) References Cited

U.S. PATENT DOCUMENTS

| 6,411,687 | B1 * | 6/2002 | Bohacek et al. ............ 379/88.21 |
| 6,798,768 | B1 * | 9/2004 | Gallick et al. ................. 370/352 |
| 7,050,569 | B1 | 5/2006 | Weaver et al. |
| 2003/0103619 | A1 | 6/2003 | Brown et al. |
| 2004/0174980 | A1 * | 9/2004 | Knott et al. .............. 379/266.01 |
| 2006/0036433 | A1 * | 2/2006 | Davis et al. .................... 704/223 |
| 2006/0221941 | A1 * | 10/2006 | Kishinsky et al. ............. 370/352 |
| 2007/0036323 | A1 * | 2/2007 | Travis ............................ 379/219 |

FOREIGN PATENT DOCUMENTS

GB  2393605  3/2004

* cited by examiner

*Primary Examiner* — Antim Shah
(74) *Attorney, Agent, or Firm* — Patrick J. S. Inouye; Krista A. Wittman; Makiko Coffland

(57) ABSTRACT

A system and method for managing hold times during automated call processing is provided. A call is received from a caller and assigned to a call session. Data is obtained from the caller and evaluated for caller attributes related to the call session. Hold times are identified during the call session. Response content is customized for at least one of the hold times using the caller attributes. The customized response content is provided to the caller during that hold time.

24 Claims, 5 Drawing Sheets

40

SYSTEM AND METHOD FOR MANAGING HOLD TIMES DURING AUTOMATED CALL PROCESSING

CROSS-REFERENCE TO RELATED APPLICATION

This non-provisional patent application claims priority under 35 U.S.C. §119(e) to U.S. Provisional Patent Application Ser. No. 60/904,296, filed Feb. 28, 2007, the disclosure of which is incorporated by reference.

FIELD

The present invention relates in general to automated call center operation and, in particular, to a system and method for managing hold times during automated call processing.

BACKGROUND

Customer call centers, or simply; "call centers," offer a convenient and universally-accessible forum for customer assistance. Most call centers are reachable by telephone, including data network-based telephone, such as Voice-Over-Internet (VoIP), although Web- and email-based customer support are becoming increasingly available.

Each customer call is an interactive process. The expectation level of callers is generally lower when they are aware that an automated system, rather than a live agent, is providing assistance. Nevertheless, callers still expect expeditious resolution of their concerns and minimizing delay is crucial, even when caller volume is high. Hold times can occur, such as when customers must be placed on hold until an agent becomes available. Call centers frequently play recorded music or advertisements to entertain callers while on hold, although callers on hold for a long time may hear the same content played repeatedly. Alternatively, call centers can feed live radio or subscription content, such as Mozak®, Fort Mill, S.C., which avoids repetition, but also relinquishes control over the content to a third party. Thus, recorded and live content only occupy time and seldom take fullest advantage of the opportunity to provide variable length or targeted content to callers while on hold.

Therefore, there is a need for providing content to call center callers who are waiting on hold that can tailor the content played based on the callers and their customer assistance situations.

SUMMARY

Hold times usually occur when a caller calls and all agents are busy. The waiting times for each on-going caller session can be evaluated to determine hold time. Each caller waiting on hold can be evaluated for attributes, such as calling location or area of customer assistance. The content played to each caller on hold can be customized to better tailor the call to the caller and to advantageously use the hold time.

An embodiment provides a system and method for managing hold times during automated call processing. A call is received from a caller and assigned to a call session. Data is obtained from the caller and evaluated for caller attributes related to the call session. Hold times are identified during the call session. Response content is customized for at least one of the hold times using the caller attributes. The customized response content is provided to the caller during that hold time.

A further embodiment provides a system and method for providing customized hold times to a caller. A call received from a caller is assigned to a call session. Call information is collected from the caller regarding a service topic. Call attributes are evaluated from the collected call information. Periods of delay are identified during the call session. The periods of delay are managed. A delay length is determined for each period of delay. Hold content for one such period of delay is customized based on the call attributes and the delay length for that period of delay. The customized hold content is played to the caller during the period of delay. The caller is provided with a response consistent with the service topic subsequent to the period of delay.

Still other embodiments of the present invention will become readily apparent to those skilled in the art from the following detailed description, wherein is described embodiments of the invention by way of illustrating the best mode contemplated for earning out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Automated Call Center Operational Environment

Figure 1:
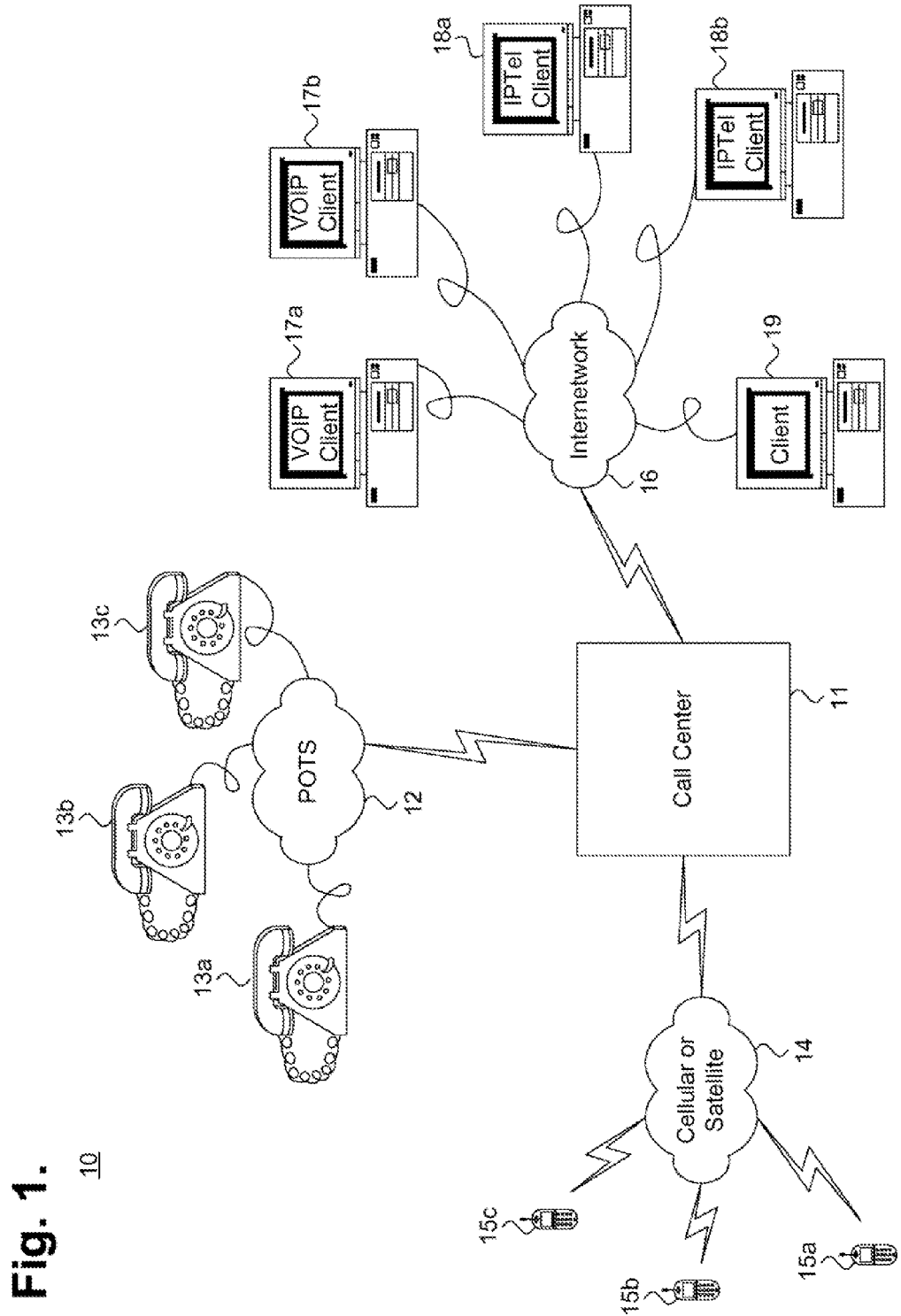
FIG. 1 is a functional block diagram showing an automated call center operational environment.

Automated call centers are a form of voice-response system, which rely upon programmed control to guide callers through a machine-generated dialogue for receiving support and problem resolution assistance. FIG. 1 is a functional block diagram showing an automated call center operational environment 10. By way of example, a multiplicity of callers call into an automated call center 11, generally through telephonic means, which can include conventional telephone handsets 13a-c through Plain Old Telephone Service (POTS) 12 portable handsets 15a-c through cellular and satellite telephone service 14, VoIP clients 17a-b, and Internet telephony clients 18a-b, as well as other forms of telephony and voice-based communications. Callers can also "call" or interface into the automated call center 11 using conventional network clients 19 through an internetwork 16, including the Internet. Other types of automated call center access are possible.

Hold times can occur under various circumstances. For example, multiple callers may call at the same time, thereby flooding the call center 11. Similarly, one agent may be handling several callers at once and need time to resolve each problem. Other circumstances causing hold times are possible.

As used herein, the terms "caller," "user," and "customer" are used interchangeably to refer to a caller to the automated call center 11. Similarly, the terms "agent," "guide," and "operator" are used interchangeably to refer to an agent that provides service provisioning for the automated call center 11. Also, "wait" and "hold" may be used interchangeably to refer to the time a caller spends holding for an agent's attention. Additionally, although the automated call center 11 is shown as a single point within the automated call center operation environment 10, the automated call center 11 could include two or more logically interconnected, but physically separate, including geographically removed, call center operations, which collectively provide a unified automated call center. Other automated call center arrangements and configurations are possible.

Automated Call Center

Figure 2:
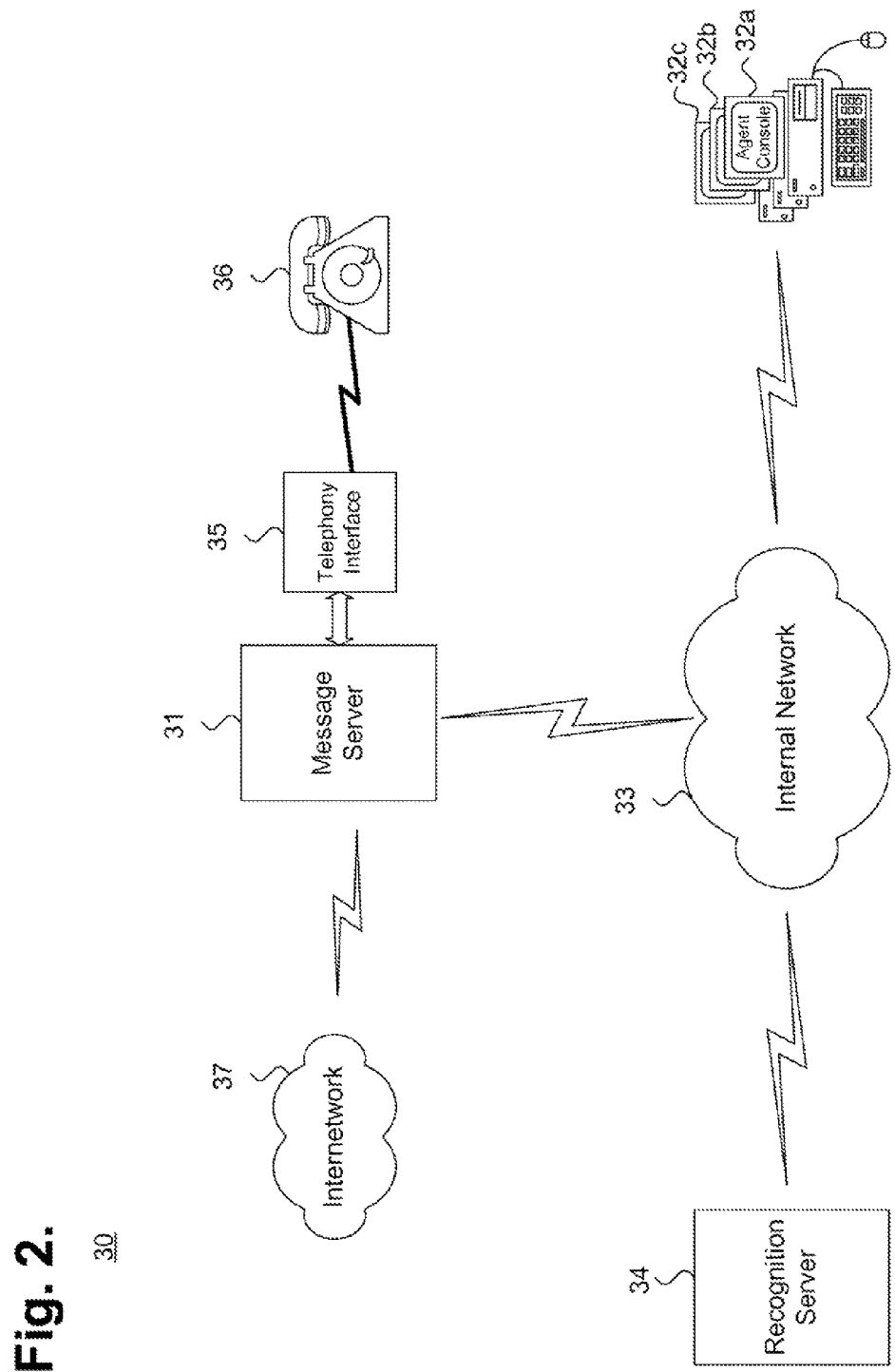
FIG. 2 is a functional block diagram showing an automated call center for use in the automated call center operational environment of FIG. 1.

Generally, an automated call center provides a single dial-in source for support and problem resolution assistance for customers seeking direct help from manufacturers and service vendors. Occasionally, the single dial-in source may experience an overflow of calls resulting in delayed response and hold times. However, automated call centers 11 can also be applied to many other diverse areas of commerce, such as mail order sales and roadside assistance dispatch. FIG. 2 is a functional block diagram showing an automated call center 30 for use in the automated call center operational environment 10 of FIG. 1. The automated call center 30 includes one or more servers 31, 34 and agent consoles 32a-c operatively interconnected over an internal network 33. The agent consoles 32a-c could also be interconnected to the message server 31 over an external network infrastructure 33, such as the Internet or a non-public enterprise data network. The network infrastructure 33 can be either wired or wireless and, in one embodiment, is implemented based on the Transmission Control Protocol/Internet Protocol (TCP/IP) network specification, although other types or combinations of networking implementations are possible. Similarly, other network topologies and arrangements are possible.

A message server 31 provides the primary message-based communications infrastructure for call center operation, such as described in commonly-assigned U.S. Pat. No. 7,292,689, issued Nov. 6, 2007, to Odinak et al., and U.S. Patent Application Publication No. 2005/0177368, published Aug. 11, 2005, to Odinak, the disclosures of which are incorporated by reference. During regular operation, the message server 31 executes individual threads to process multiple simultaneous calls, which are handled by agents executing agent applications on agent consoles 32a-c. Hold time can occur, for instance, if the agents become overloaded.

Customer calls are received through a telephony interface 35, which is operatively coupled to the message server 31 to provide access to a telephone voice and data network 36. In one embodiment, the telephony interface connects to the telephone network 36 over a T-1 carrier line, which can provide up to 24 individual channels of voice or data traffic provided at 64 kilobits (Kbits) per second. Other types of telephone network connections are possible.

The automated call center 30 also includes a recognition server 34 that interfaces directly to the message server 31 as a top-level or root tier of a speech recognition hierarchy. The message server 31 sends streamed audio data for each incoming call to the recognition server 34, which performs distributed speech recognition, such as described in commonly-assigned U.S. Patent Application Publication No. 2007/0162282, published Jul. 12, 2007, to Odinak; and U.S. Provisional Patent application, Ser. No. 60/757,356, filed Jan. 9, 2007, abandoned, the disclosures of which are incorporated by reference. The message server 31 assigns grammar generation and speech recognition to the recognition server 34. Upon startup, the telephony gateway 35 opens a T-1 carrier device channel for each available T-1 time slot. The telephony gateway 35 initiates a new connection to the message server 31, one connection per T-1 device channel, and the message server 31, in turn, initiates a corresponding new connection to the recognition server 34.

The separate telephony gateway-to-message server and message server-to-main recognizer connections form one concurrent session. When a customer call is answered or connected, the telephony gateway 35 sends a call message to the message server 31. The message server 31 then sends a new call message to the recognition server 34.

The message server 31 also assigns each new call to one of the agent consoles 32a-c through dynamic load balancing, such as described in commonly-assigned U.S. patent application, Ser. No. 11/893,542, filed Aug. 15, 2007, pending; and U.S. Provisional Patent application, Ser. No. 60/838,074, filed Aug. 15, 2006, abandoned, the disclosures of which are incorporated by reference. Each agent console 32a-c provides the primary means for direct customer interaction by providing service provisioning and related assistance to callers, such as further described below with reference to FIG. 3.

The main purpose of each agent console 32a-c is to execute one or more agent applications, which display both user and agent messages and provide menus of actions that can be executed in response to agent commands, including script execution and management of variable hold time. One or more agent applications execute on each agent console and one or more agent consoles can execute in parallel. Alternatively, multiple instances of agent applications can run on a server machine, and can be accessed and, if needed, modified by agents at agent consoles operating as remote terminals.

Each component, including the message server 31, recognition server 34, and agent consoles 32a-c, is implemented as a computer program, procedure or module written as source code in a conventional programming language, such as the C++ programming language, and presented for execution by a computer system as object or byte code. Alternatively, the components could be directly implemented in hardware, either as integrated circuitry or burned into read-only or read-rewriteable memory components. The various implementations of the source code and object and byte codes can be held on a computer-readable storage medium or embodied on a transmission medium in a carrier wave.

Exemplary Typical Call Sequence

Callers interface with an agent indirectly, who multitasks through one or more caller sessions via an agent console 32a-c. The callers only perceive an automated calling interface heard, for instance, through their telephone or portable handset and do not actually speak with the agent person-to-person.

Figure 3:
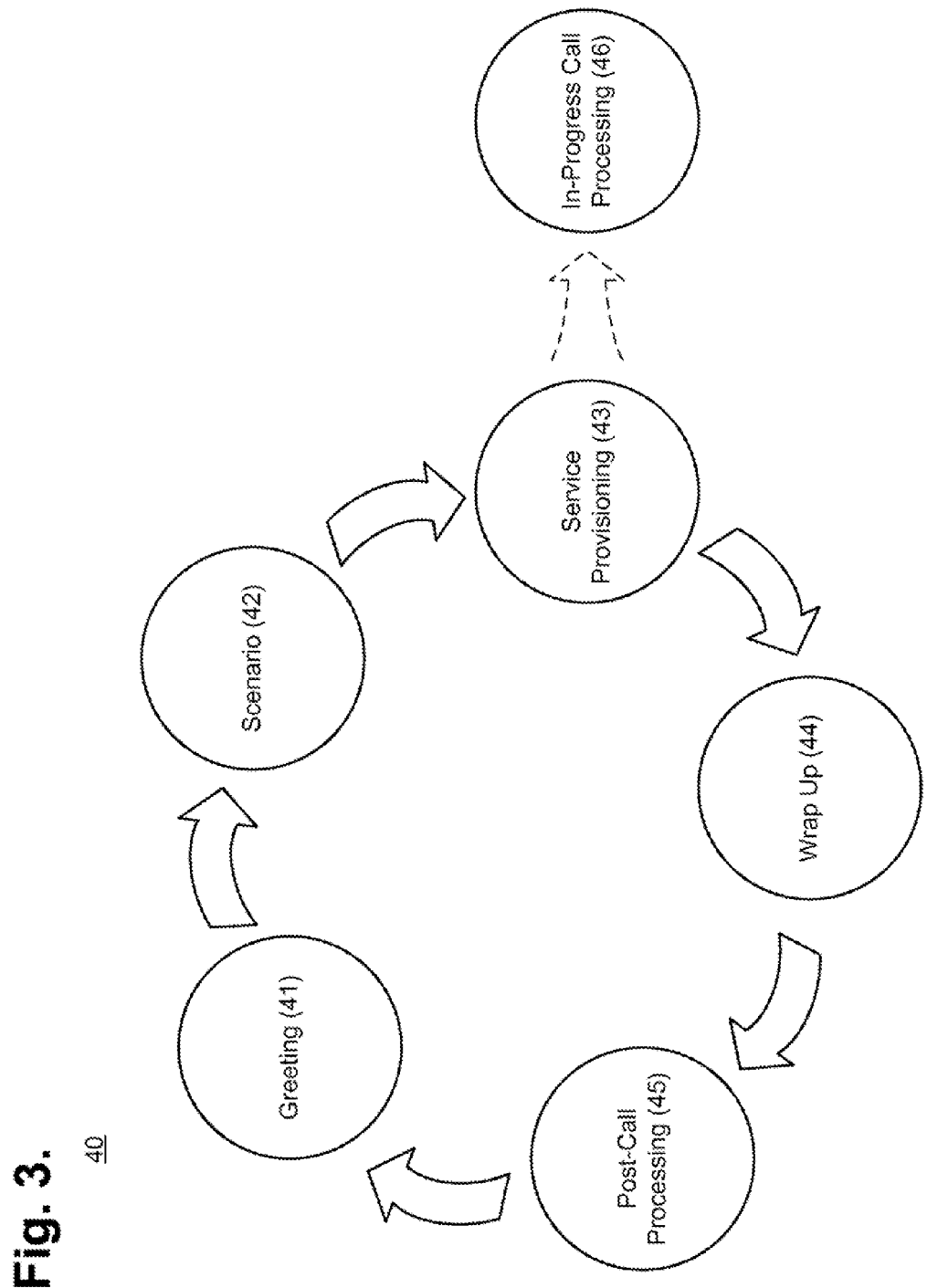
FIG. 3 is a process flow diagram showing, by way of example, a typical call sequence, as transacted by the automated call center of FIG. 2.

Calls are processed through a sequence of phases. FIG. 3 is a process flow diagram showing, by way of example, a typical call sequence 40, as transacted by the automated call center 30 of FIG. 2. Although the form of call processing required may vary by subject matter and other factors, the same overall sequence of caller-to-agent interchanges will loosely apply.

A caller session starts with an incoming call and continues through to call termination, including any hold times. Initially, upon calling into the call center 30, each caller receives an initial greeting and informational message 41 providing a synopsis of caller options, which enable the caller to navigate to a specific topic for assistance or support. Following option selection, the caller engages in a customer assistance or support scenario 42 with an agent, which is either a live person or an automated prompt, such as generated by an automated voice response system, to collect information and problem troubleshoot. The scenario 42 can be delayed due to agent unavailability, caller volume, and other factors, which require the caller to be placed on hold.

Figures 4, 5:
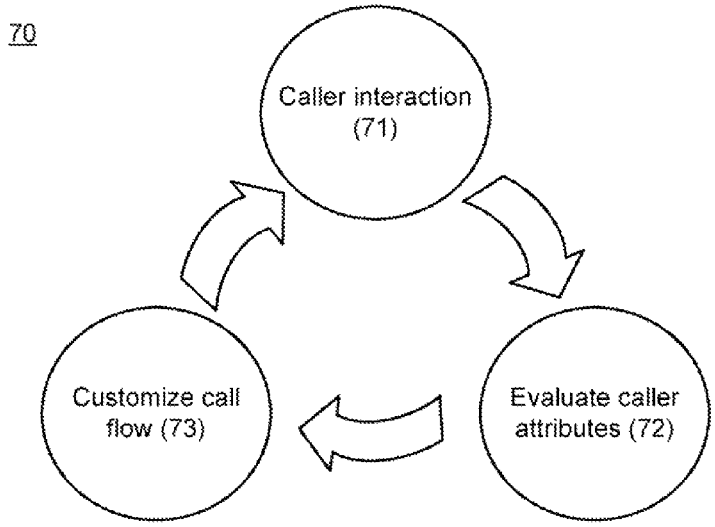
FIG. 4 is a screen diagram showing, by way of example, a view of an agent console for an on-going call session.
FIG. 5 is a process flow diagram showing a method for managing a dynamic call flow during automated call processing, in accordance with one embodiment.

Throughout each session, the interactive call flow and hold time of each call can be adjusted by evaluating caller attributes, such as described below beginning with reference to FIG. 5. In addition, the order in which information is gathered from a caller, such as identifying the caller's needs or problems, can be dynamically evaluated and controlled, such as further described in commonly-assigned U.S. patent application, Ser. No. 11/893,442, filed Aug. 15, 2007, pending; and U.S. Provisional Patent application, Ser. No, 60/838, 102, filed Aug. 15, 2006, abandoned, the disclosures of which are incorporated by reference.

As required, service-provisioning 43 is provided to the caller, either directly during the course of the call or indirectly through a service request dispatch. Service provisioning may be stalled as the agent collects information to address the caller's particular needs or is attending to other callers during high call volume, thereby resulting in callers being placed on hold. The content heard by the caller can be customized to the caller or situation, as further described below with reference to FIG. 7. The content can include product information, advertising, or location-oriented materials. The playback speed can also be adjusted to better suit the length of expected delay. Following service provisioning 43, the call ends in wrap-up 44, which provides closure to the call and a departing salutation. Other customer call sequences are feasible. Importantly, however, from the perspective of the caller, the experience appears to be an interaction with an intelligent machine and the caller is aware that the agent is automated, not human. Accordingly, a typical caller will have a more relaxed expectation of agent responsiveness since a machine, and not an actual person, is on the line.

Following call termination, the call center 30 can perform post-call processing 45, such as identifying sound "bites," that is, speech utterances in each call for analysis and storage in a database 34. The speech utterances can be presented to an agent for review and manipulation, such as ranking or reordering. In addition, the post-call processing 45 can include performing speech recognition on the speech utterances, identifying speaker characteristics, and marking certain speech utterances and holding prompt selections for later use. In a further embodiment, the call center 30 can also perform, in-progress call processing 46, which operates on a stream of speech utterances copied from on-going calls. The same types of processing operations can be performed as on completed calls, but allows real time call analysis.

Exemplary Agent Console

Call sessions are displayed on each agent console through a graphical user interface (GUI). FIG. 4 is a screen diagram showing, by way of example, a view of an agent console 50 for an on-going call session. Multiple call sessions can be simultaneously displayed and managed through the GUI controls.

The particulars concerning the live call session are obtained by the message server 31 and provided to the agent. The session particulars can include, for instance, a caller profile including last hold time, personal prompt, options selections, modifications by the caller 51, address 52, contact information 53, reason for the call 54, credit card data 55, and system available options for hold time. Other types of session particulars are possible.

During a session, the agent can request a display update by pressing an "Update" control 56 and can review a recording of the caller's spoken responses through intuitive playback controls 57. Additionally, the agent can transfer the caller to a live agent by pressing a "Transfer to Live Agent" control 58 and can log out by pressing a "Logout" control 59. Other GUI controls are possible.

Dynamic Call Flow Management

Caller sessions, including managed hold times, can be dynamically customized by an agent at any point during a call. FIG. 5 is a process flow diagram showing a method 70 for managing a dynamic call flow during automated call processing, in accordance with one embodiment. Although a caller interlace would ordinarily be modified or adjusted by the agent that is assigned to a call session, the caller interface could also be modified by another agent console or by a server based on known caller attributes and conditions. Generally, with the exception of hold times, the caller and agent engage in interaction throughout the call session (operation 71), such as described above with reference to FIG. 3. Throughout the session, the agent, with the assistance of the agent console 32a-c, or message server 31, can evaluate the caller attributes (operation 72) and customize call flow and caller options, including hold time (operation 73), as farther described below with, reference to FIGS. 6 and 7. Caller interaction, attribute evaluation, hold times, and call flow customization, can be repeated as necessary throughout the remainder of the session.

Caller Attributes

Figure 6:
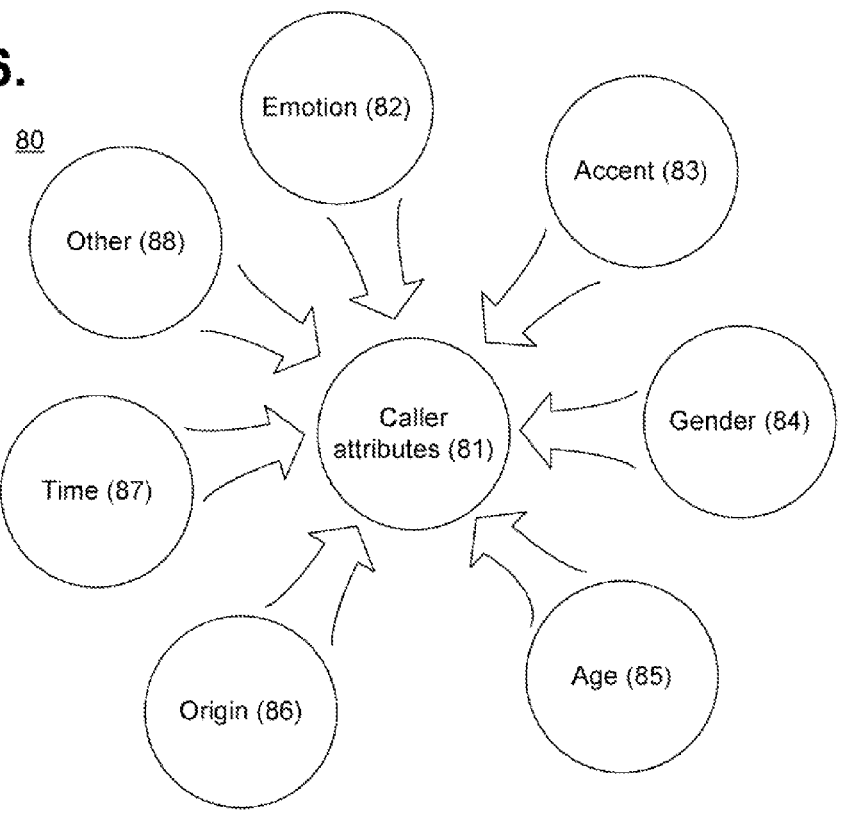
FIG. 6 is a block diagram showing, by way of example, caller attributes evaluated during dynamic call How management.

Caller attributes depend upon both the caller and call characteristics. FIG. 6 is a block diagram showing, by way of example; caller attributes 81 evaluated 80 during call. Caller-specific attributes can relate to perceived caller idiosyncrasies. Call characteristics exist independently of the caller and can be artifacts of both the physical medium and call timing.

Caller attributes 81 that relate to the caller specifically include emotion 82, accent 83, gender 84, and age 85. Unless independently confirmed, for instance, through a questionnaire or database lookup, these caller attributes are perceived based on the subjective impressions of the agent or through automated analysis.

Physical caller-independent attributes 81 include origin of the call 86 and the call time 87. The caller origin 86 can be determined, for example, through area code or zip code lookup, and the call time 87 is available through automated timestamp. Other caller attributes 88 are possible.

Caller Options

Figure 7:
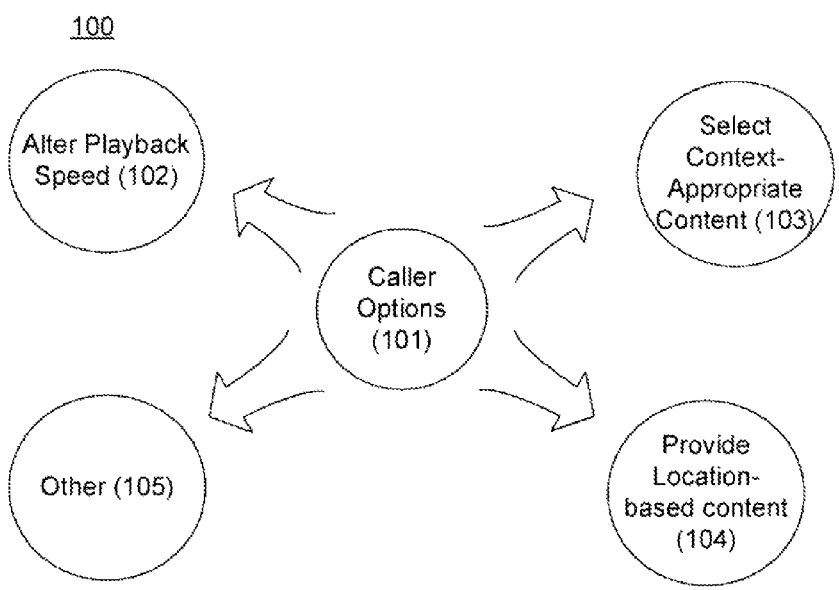
FIG. 7 is a block diagram showing, by way of example, customized caller options for managing hold times, in accordance with one embodiment.

Caller options can vary for different reasons. The caller interface can be flexibly managed to improve the caller's experience and to benefit the manufacturer or vendor. FIG. 7 is a block diagram showing, by way of example, customized caller options 100 for managing hold times, in accordance with one embodiment. Caller options 100 that relate to the current call contest include altering playback speed 102 and selecting context-appropriate content 103. Caller options 100 that relate to the caller include providing location-based content 104. Other caller options 105 are possible. The options 100 can be triggered automatically or upon agent request.

Hold time can be estimated by evaluating the length of the hold queue, the level of busyness of each agent, and upon the profile of the customer, for example, whether the customer is a preferred customer with enhanced service or a new customer. Other hold time estimation factors are possible. Different speeds and lengths of hold lime content may be employed as needed to fill the estimated hold time. For example, depending upon the length of the hold queue or the time an agent needs to collect information to accurately and precisely address callers' needs, content may be more or less verbose, or may be shorter or longer.

While the invention has been particularly shown and described as referenced to the embodiments thereof, those skilled in the art will understand that the foregoing and other changes in form and detail may be made therein without departing from the spirit and scope of the invention.

What is claimed is:

1. A system for managing hold times during automated call processing, comprising:
    a message server to monitor a call between a caller and an agent;
    a data module to receive from the agent subjective impressions of the agent about the caller;
    an evaluation module to determine hold times during the call based upon a profile of the caller and to adjust the hold times based on the subjective impressions comprising caller attributes perceived by the agent;
    a customization module to customize response content for at least one of the hold times using the caller attributes and to provide the customized response content to the caller during that hold time; and
    a content speed module to alter the customized response content by altering playback speed.

2. A system according to claim 1, wherein the customized response content comprises at least one of context-appropriate content and location-based content.

3. A system according to claim 1, further comprising:
    an estimation module to estimate a length of each hold time by one or more of evaluating a hold queue length and the level of busyness of the agent.

4. A system according to claim 1, further comprising:
    a caller attribute module to determine the caller attributes from one or more of a caller questionnaire, a database, and through automated analysis.

5. A system according to claim 1, further comprising:
    a post-call processing module to perform post-call processing comprising at least one of performing speech recognition, identifying characteristics of the caller, and marking speech utterances of the caller.

6. A system according to claim 1, wherein the response content comprises one or more of product information, advertising, and location-oriented materials.

7. A system according to claim 1, wherein the caller attributes comprise at least one of call origin and time of the call.

8. A method for managing hold times during automated call processing, comprising:
    monitoring a call between a caller and an agent;
    obtaining data from the caller and receiving from the agent subjective impressions of the agent about the caller;
    determining hold times during the call based upon a profile of the caller and adjusting the hold times based on the subjective impressions comprising caller attributes perceived by the agent;
    customizing response content for at least one of the hold times using the caller attributes and providing the customized response content to the caller during that hold time; and
    altering the customized response content by altering playback speed.

9. A method according to claim 8, wherein the customized response content comprises at least one of context-appropriate content and location-based content.

10. A method according to claim 8, further comprising:
    estimating a length of each hold time by one or more of evaluating a hold queue length and the level of busyness of the agent.

11. A method according to claim 8, further comprising:
    determining the caller attributes from one or more of a caller questionnaire, a database, and through automated analysis.

12. A method according to claim 8, further comprising:
    performing post-call processing comprising at least one of performing speech recognition, identifying characteristics of the caller, and marking speech utterances of the caller.

13. A method according to claim 8, wherein the response content comprises one or more of product information, advertising, and location-oriented materials.

14. A method according to claim 8, wherein the caller attributes comprise at least one of call origin and time of the call.

15. A system for providing customized hold times to a caller, comprising:
    a message server to assign a call received from a caller to a call session;
    a collection module to collect call information from the caller regarding a service topic and to receive subjective impressions of an agent about the caller based on the collected call information;
    a delay module to identify periods of delay during the call and to manage the periods of delay, comprising:
        a determination module to determine a delay length for each period of delay based upon a profile of the caller;
        an adjustment module to adjust the delay length for each period of delay based on the subjective impressions comprising caller attributes perceived by the agent;
        a customization module to customize hold content for one such period of delay based on the call attributes and the delay length for that period of delay;
        a content module to play the customized hold content to the caller during the period of delay; and
        a content speed module to alter the customized response content by altering playback speed; and
    a response module to provide the caller with a response consistent with the service topic subsequent to the period of delay.

16. A system according to claim 15, further comprising:
    a recorder to record speech utterances from the call session; and
    a database to store the speech utterances.

17. A system according to claim 16, further comprising:
    a processor to perform at least one of in-progress call processing and post-call processing on the speech utterances from the call session.

18. A system according to claim 15, wherein the call attributes are evaluated based on at least one of caller-specific attributes comprising one or more of call characteristics comprising one or more of a call origin and a call time.

19. A system according to claim 15, further comprising:
    an agent console to maintain the call session and one or more other call sessions.

20. A method for providing customized hold times to a caller, comprising:
    assigning to a call session, a call received from a caller;

collecting call information from the caller regarding a service topic and receiving subjective impressions of an agent about the caller based on the collected call information;
identifying periods of delay during the call session and managing the periods of delay, comprising:
determining a delay length for each period of delay based upon a profile of the caller and adjusting the delay length for each period of delay based on the subjective impressions comprising caller attributes perceived by the agent;
customizing hold content for one such period of delay based on the call attributes and the delay length for that period of delay;
playing the customized hold content to the caller during the period of delay; and
altering the customized response content by altering playback speed; and
providing the caller with a response consistent with the service topic subsequent to the period of delay.

21. A method according to claim 20, further comprising:
recording speech utterances from the call session; and
storing the speech utterances in a database.

22. A method according to claim 21, further comprising:
performing at least one of in-progress call processing and post-call processing on the speech utterances from the call session.

23. A method according to claim 20, wherein the call attributes are evaluated based on at least one of caller-specific attributes comprising call characteristics comprising one or more of a call origin and a call time.

24. A method according to claim 20, further comprising:
maintaining the call session on an agent console, wherein the agent console maintains other call sessions.

* * * * *